May 2, 1961
M. VANZO ET AL
2,982,327
PNEUMATIC TIRE
Filed Feb. 15, 1955
3 Sheets-Sheet 1
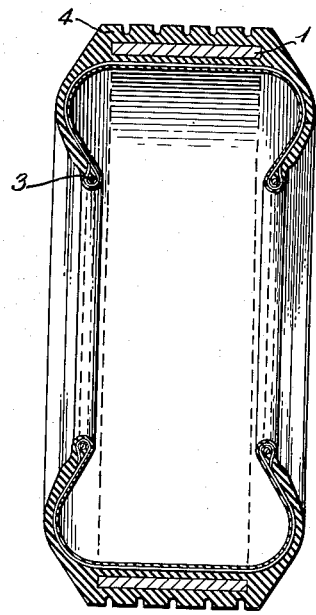
Fig.1.
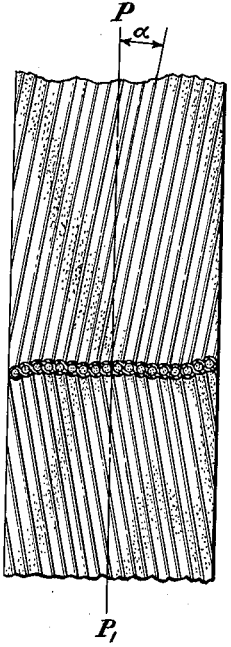
Fig.2.
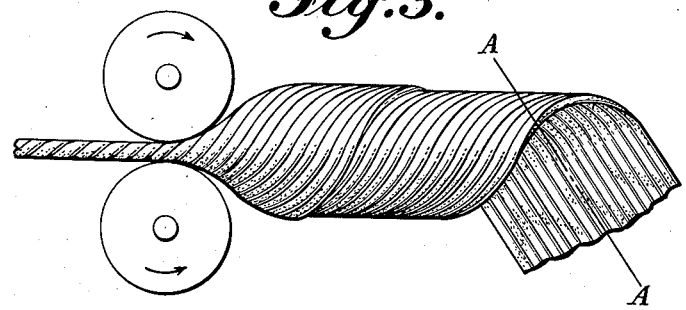
Fig.3.
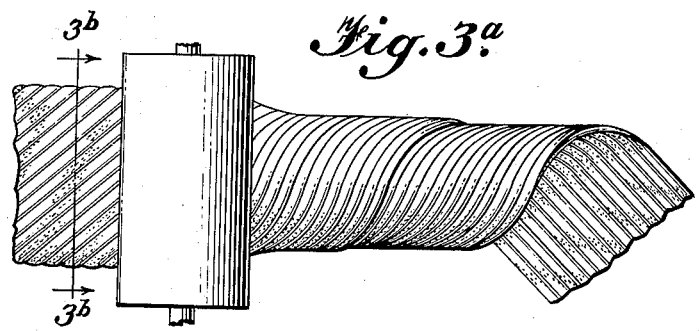
Fig.3ª.
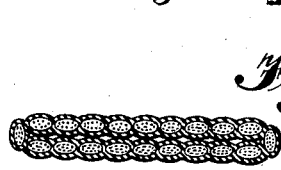
Fig.3ᵇ.
INVENTORS
MARCELLO VANZO,
GIUSEPPE LUGLI AND
CARLO MAZZA
BY Stevens, Davis, Miller & Mosher
ATTORNEYS May 2, 1961  M. VANZO ET AL  2,982,327
PNEUMATIC TIRE
Filed Feb. 15, 1955
3 Sheets-Sheet 2
Fig. 4.
Fig. 6.
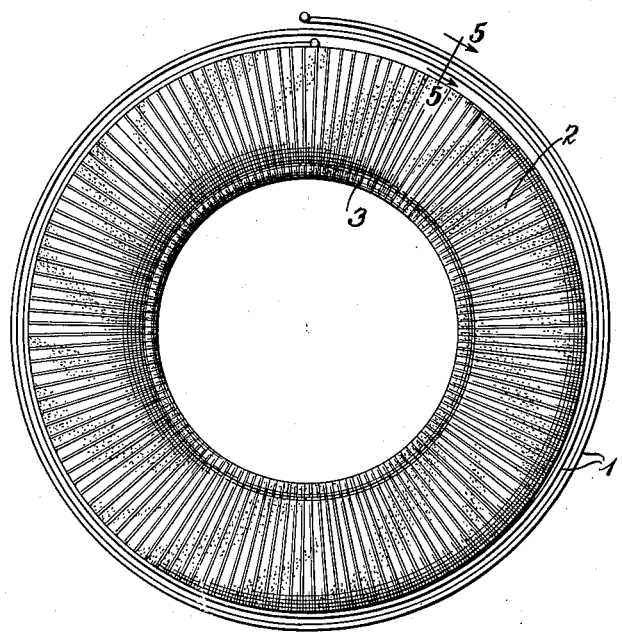
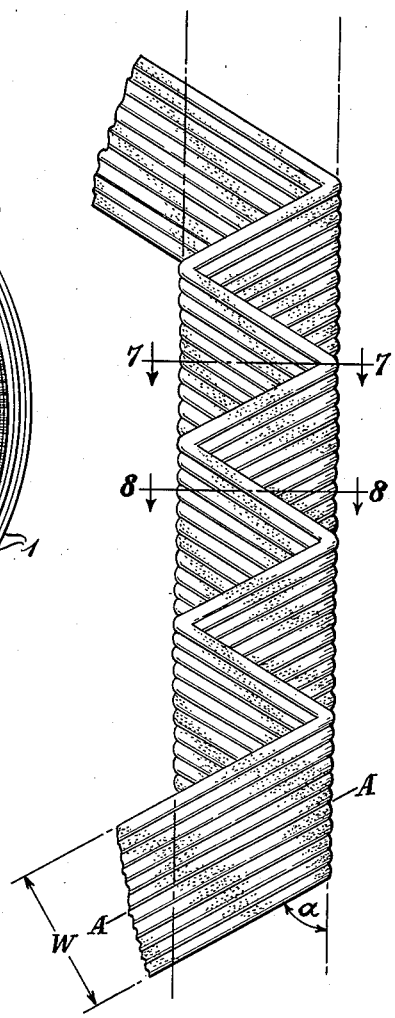
Fig. 5.
Fig. 7.
Fig. 8.
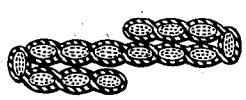
INVENTORS
MARCELLO VANZO,
GIUSEPPE LUGLI AND
CARLO MAZZA
BY Stevens, Davis, Miller & Mosher
ATTORNEYS May 2, 1961  M. VANZO ET AL  2,982,327
PNEUMATIC TIRE
Filed Feb. 15, 1955  3 Sheets-Sheet 3

INVENTORS
MARCELLO VANZO,
GIUSEPPE LUGLI AND
CARLO MAZZA
BY Stevens, Davis, Miller & Mosher
ATTORNEYS

United States Patent Office 2,982,327
Patented May 2, 1961

2,982,327

PNEUMATIC TIRE

Marcello Vanzo, Giuseppe Lugli, and Carlo Mazza, Milan, Italy, assignors to Pirelli S.p.A., Milan, Italy Filed Feb. 15, 1955, Ser. No. 488,286

Claims priority, application Italy Mar. 5, 1954

4 Claims. (Cl. 152—361)

The present invention relates to an improvement in the construction of pneumatic tires for vehicle wheels of all types and in particular the present invention relates to an improved method for producing a flexible ring-shaped or belt structure for incorporation into pneumatic tires and the improved belt structure and improved pneumatic tire resulting therefrom.

By referring to Figure 1 of the drawings, there will now be described in a general way a pneumatic tire of the type and character that includes a flexible ring-shaped or belt structure. As will be evident from the illustrations of Figure 1, the pneumatic tire represented therein is substantially constituted of a flexible ring-shaped structure 1, serving as the belt structure of the tire, located below the tread portion 4 and connected to the rims or bead ring assemblies 3 through the intermediary of the tire carcass 2. The ring-shaped or belt structure 1 usually consists of thread filaments, single or twisted to form cords, made from any textile or metallic material suitable to withstand the tension stresses encountered during manufacture and use of the finished article. As is common, the threads or cords are coated with, or alternatively imbedded in a compound of natural or synthetic rubber or a plastic or resinous material of any suitable kind or character. The tire carcass 2 is likewise composed of single or twisted threads disposed in one or more layers usually designated as plies. In each ply, the threads are parallel with respect to each other and the layers or plies are frequently superimposed so that the threads of one ply extend in a direction slightly different from or slightly opposed to the direction of the threads of an adjacent superimposed ply. By this arrangement corresponding threads in two adjacently superimposed plies define between them a relatively small and oftentimes negligible angle such that the direction of the threads in each ply substantially intersects the equatorial plane of the tire at an angle equal to or about 90°.

It is a principal object of the present invention to provide novel methods for practically constructing the flexible ring-shaped structure or belt structure designated in Figure 1 by numeral 1 in a manner to overcome the disadvantages and inconveniences which have been previously encountered when constructing this element according to prior art practice.

It is now recognized that a desirable form for the flexible ring-shaped structure or belt structure contemplates an arrangement wherein the thread elements of the several plies are disposed in different or diverse directions such as to be in a crossed relation. As previously recognized, the thread or cord elements of each ply are disposed in parallel relationship and are coated according to prior known methods with compounds of natural or synthetic rubber or with plastic or resinous compounds and the plies are superimposed to thus lie in parallel planes with the direction of the threads of each ply (plane) being in a crossed relationship with the direction of corresponding threads or cords of an adjacent superimposed ply (parallel plane). Due to the necessity for the structure to withstand unusual tension stresses, the threads are preferably disposed in a longitudinal direction, as is illustrated in Figure 2, such that the angle alpha formed or defined by corresponding threads in adjacent or superimposed layers or plies with the equatorial (mid-circumferential) plane identified as $P-P_1$ in Figure 2 is quite small, that is preferably of a value ranging between 0° and 10°. As will be evident from Figure 2, the upper layer is partly broken away in order to show the elements of the layer lying below it. Although this arrangement is preferable in most respects, it is subject to the inconvenience or disadvantage that the single thread or cord elements of each layer or ply are left with their ends free along the marginal edges of the belt and thus the ends are retained in position only by the compound of rubber or of plastic materials into which the thread or cord elements are imbedded. It should thus be apparent that under the action of the cyclic deformations arising during use of the tire, the ends of the thread or cord elements are subjected to forces which may produce small movements of the ends of the thread or cord elements and, hence, in the course of time the ends may be detached from the compound in which they are imbedded.

Accordingly, it is a further object of the present invention to provide an improved method for preparing the flexible ring-shaped or belt structure which will overcome the disadvantages and inconveniences resulting from utilizing thread or cord elements the ends of which are free in each layer or ply.

It is likewise an object of this invention to provide an improved structure to serve as the flexible ring-shaped structure or belt structure and an improved pneumatic tire characterized by a flexible ring-shaped structure of unique design.

According to the present invention, the problem of handling the free ends of the threads or cords in each ply is solved by eliminating or suppressing the ends of each ply. In one embodiment of the present invention, this can be accomplished by making the flexible ring-shaped or belt structure as a tube by helically wrapping, at a suitable pitch, a strip of fabric (a cord fabric or an assembly of threads or cords disposed in parallel relationship without transversal textile connections imbedded in a compound of rubber or of plastic material) of suitable width around any apparatus suitable to permit or allow this operation so that the threads are disposed at a predetermined angle with respect to a drum generating line. The resulting tube is thereafter squeezed or flattened by suitable apparatus, as for example, a pair of rollers in order to obtain an assembly of threads disposed in two superimposed layers or plies wherein the threads or cords lying in one of the plies have their ends joined with the ends of the corresponding threads or cords forming the other of the layers or plies. By making the ring-shaped or belt structure in this fashion, it will be realized that the cord or thread elements in each layer or ply are disposed in a crossing relationship and that corresponding threads or cords in the two layers or plies define between them the desirable angle alpha (see Figure 2). In other embodiments of this invention, this problem is solved by folding a strip of fabric in a zig-zag pattern or by winding a thread or cord in zig-zag fashion on a suitable form to build-up the belt structure.

Other and further objects of the present invention will become more fully apparent from the following detailed description when taken in conjunction with the drawings in which:

Figure 1 represents in a general way a conventional pneumatic tire;

Figure 2 is a plan view partly broken away of a flexible ring-shaped or belt structure;

Figure 9:
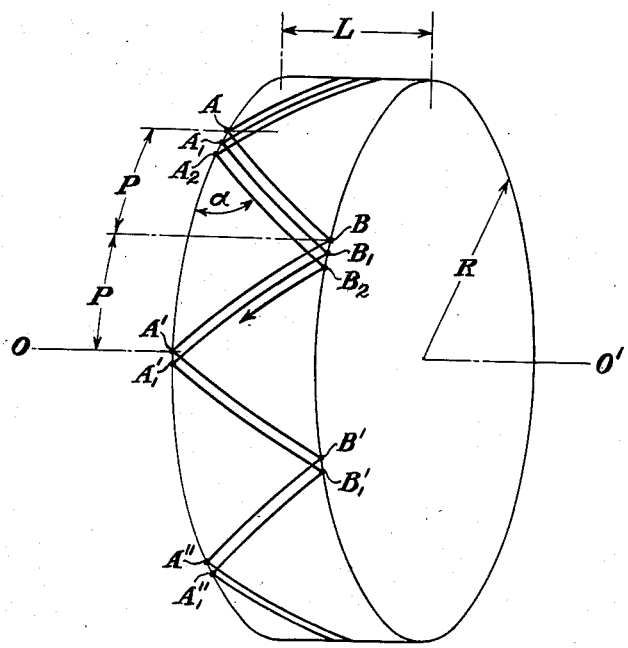
Figure 10:
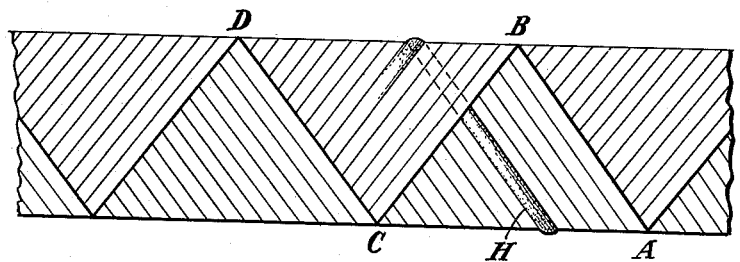

Figures 3 and 3a, in elevation and plan respectively, represent schematically a novel method for making an improved flexible ring-shaped or belt structure;

Figure 3b is a view in section taken along line 3b—3b of Figure 3a;

Figure 4 illustrates the wrapping of the improved flexible ring-shaped or belt structure upon a tire carcass;

Figure 5 is a view in section taken along line 5—5 of Figure 4;

Figure 6 represents another novel method for producing an improved flexible ring-shaped or belt structure;

Figure 7 is a view in section taken along lines 7—7 of Figure 6;

Figure 8 is a view in section taken along line 8—8 of Figure 6;

Figure 9 illustrates schematically still another novel way of producing the improved flexible ring-shaped or belt structure; and Figure 10 is a plan view of the improved flexible ring-shaped or belt structure produced by the method schematically illustrated in Figure 9.

Referring particularly to Figures 3 and 3a, there is shown schematically a method for producing an improved flexible ring-shaped or belt structure which includes the steps of wrapping a strip of fabric consisting of an assembly of threads or cords disposed parallel to the axis AA of the fabric, or in other words, the longitudinal axis of the fabric strip, in helical fashion at proper pitch to form a tube. Although the form or apparatus about which the fabric is wound in the formation of the tube is not shown in Figure 3, it will be appreciated that any suitable form or apparatus can be used in this manipulative operation. It will also be appreciated that the width of the fabric strip will have to be selected in accordance with the desired width of the finished flexible ring-shaped or belt structure. The selection of fabric width can easily and readily be made based upon the pitch of the helical wrapping. Subsequent to the formation of the tube, by helically wrapping the fabric strip, the tube is flattened or squeezed, as for example, by a pair of rollers in order to produce the finished flexible ring-shaped or belt structure. As will be noticed from Figures 3, 3a, and 3b, the finished belt structure is not subject to the disadvantage or inconvenience of the threads in each of the two superimposed layers or plies having free ends. Rather, the ends of the threads in each of the layers or plies is joined with, integral with or a continuation of the threads or cords disposed in the other of the layers or plies. Further, the disposition of the threads or cords in one of the plies with respect to the disposition of the threads or cords in the other of the plies results in the definition of an acute angle between corresponding threads or cords in the two superimposed plies. Stated in other words, the threads or cords in the two plies, although being parallel with the threads or cords in the same ply, are in a crossed relationship with the threads or cords in the other of the plies.

The finished flexible ring-shaped or belt structure can be wrapped for one or more turns about a tire carcass until the required degree of tensile strength is obtained. In this respect, Figure 4 shows schematically a side view of a tire lacking a tread and side walls. As will be evident from Figure 4, the improved flexible ring-shaped or belt structure has been wrapped around the tire carcass two turns, thus resulting in the threads or cords of the four layers or plies constituting the belt structure being disposed in four distinct planes or plies with the plies being related in pairs whereby the ends of the threads or cords in each pair of plies are joined with or integral with or in continuation of the threads or cords of the other of the pair of plies. In Figure 4 the numeral 2 represents the radial elements of the carcass and the numeral 3 represents the rims of the tire or the bead ring assemblies. The sectional view of Figure 5 shows clearly the paired association of the superimposed plies and further the fact that in this structure there are no free ends of the threads or cords along the peripheral margins of the belt structure.

According to the above description, a tension-resistant structure is produced distinctly different from an assembly wherein a plurality of single strips are superimposed. The novel structure, however, can be usefully employed in the same way, and for the same purposes as the prior art structures advanced in this respect although the novel structure possesses many structural and functional advantages. The structure described is particularly flexible in a radial direction and therefore assures a remarkable running comfort. When subjected to high tensile stresses, the improved structure is well capable to withstand them and shows a lesser elongation than do belt structures composed merely of superimposed layers of single individual strips as previously described in the art. As a result of experimental laboratory tests, it has been proved that the novel flexible ring-shaped or belt structure according to the present invention, due to the joint or linkages which bond the thread or cord elements at the peripheral margins of the flexible ring-shaped or belt structure, possesses greater strength and durability in comparison with previously employed structures. The introduction or incorporation of the improved belt structure in the manufacture of tires represents a remarkable improvement from the working standpoint especially in view of its simpler construction and ease of manufacture.

Another way for producing an improved flexible ring-shaped or belt structure according to the present invention is illustrated in Figures 6 to 8 inclusive. As clearly shown by these illustrations, a strip of fabric, having a width W and composed of threads or cords parallel to its long axis A—$A_1$ is folded alternatively in both senses as it is illustrated or in other words in a zig-zag overlapping or superimposed pattern. By this means, a structure is obtained which can be considered as consisting of a series of parallelograms superimposed upon one another for one half of their whole surface namely for a zone correspondingly to a triangle. In each of the parallelograms, the threads or cords lying within the perimeter have their ends joined with, integral with, or a continuation of the threads or cords of the parallelogram upon which it is superimposed. Further, the disposition of the parallelograms is such that the threads or cords lying in each triangular section have a direction symmetrically crossed with the direction of the threads lying in the triangular section disposed either below or above them.

An advantage achieved by producing the improved flexible ring-shaped or belt structure in this way is that the structure may be obtained from a very thin fabric strip or it can even be produced by using a single thread covered with a compound based on an uncured natural or synthetic rubber or any suitable plastic material and winding the coated single thread on a form such as a drum at a suitable pitch.

Such a mode of producing an improved flexible ring-shaped or belt structure is schematically illustrated in Figures 9 and 10. As shown in Figure 9, a drum is provided having a width L, an axis O—O' and a radius R. Starting from any point A on one marginal peripheral edge of the drum, a thread previously covered with a compound of rubber or plastic material is disposed in such a way that it reaches a point B on the opposite marginal peripheral edge of the drum. As will be evident, the thread is disposed at a pitch P and extends for a distance equal to the arc of circumference existing between the generating lines of the cylindrical drum which pass through points A and B. From point B, at equal pitch, the thread is drawn to point A' located peripherally spaced from A a value equal to 2P. Continuing the procedure in this alternative fashion, if the number of pitches P is even, namely if $$P = \frac{2\pi R + S}{2N}$$

where N equals any whole number, and S equals the thickness of the rubberized thread, after a complete turn, the thread will reach point $A_1$ immediately adjacent to point A. Continuing the procedure further the whole surface of the cylinder will ultimately be covered with threads disposed in side-by-side relation so as to obtain practically a continuous surface by virtue of the adhesive property of the coating of rubber or plastic material which covers the threads. It will undoubtedly be appreciated that the above operations could also be carried out in an identical fashion using a narrow strip composed of a plurality of threads or cords instead of merely using a single thread.

It will be evident that the above described procedure may be carried out either directly upon a tire carcass or else upon a suitable shrinkable, compressible, or collapsible drum and after removal be inserted onto the tire carcass. It is likewise evident that the above procedure may be continued after the formation of a flexible ring-shaped structure of two plies or layers by continuing to build up over the first laid down thread an additional layer of thread and in this way obtain the required or desired degree of tensile strength for the flexible ring-shaped structure. There is, as will be recognized, no limit to the number of layers of thread which can be formed by this procedure.

The flexible ring-shaped structure obtained by this procedure will not show along its marginal edges any free ends of thread nor any joints between the threads lying in different layers or planes. Moreover the structure, considered as a ring, will give the appearance from both the inside and the outside of being constituted of a succession of isosceles triangles in which the direction of the thread of two adjacent triangles is different with the direction of the threads being the same in successive alternate triangles throughout the ring.

The threads lying in the same plane of the flexible ring-shaped structure are never crossed by other threads in the sense a woven fabric is composed of crossed interlaced threads and accordingly, the final structure, while maintaining all the desirable functional advantages of a cord fabric does not display the defects or disadvantages of the so called "square fabrics" namely those characterized by a warp and weft.

The angle at which the threads or cords lying in a plane cross those cords or threads lying in an adjacent plane will depend upon the perimeters L and R representing width and radius of the building drum and on the number 2P of pitches. The particular number must be selected in order to secure an angle of inclination of the thread or cord elements with respect to the mid-circumferential plane of the tire in order to impart to the final structure good resistance to longitudinal tension. At the same time, however, the angle must be such as to allow or permit a suitable resistance to the bending action caused by forces parallel to the axis O—O' of the building drum or of the tire itself in order to give to the tire sufficient lateral stability. A further characteristic property of the above described flexible ring-shaped structure which substantially differentiates it from those previously employed, stems from the anchoring of the flexible ring-shaped structure to both the tire carcass and the tread portion of the pneumatic tire. Considering in this respect Figure 10, it will be noted that the exposed part of any thread H of triangle ABC is anchored to the tread portion, whereas the hidden part of the thread H in the triangle BCD is directly anchored to the structural element lying below it, as for example, the tire carcass disposed beneath the flexible ring-shaped structure. The above described property greatly improves the anchoring relationship between the tire carcass and tire tread in comparison with other structures made simply of superimposed plies or tufts. In this way, the structure of the present invention differentiated not only on the basis of a geometrical pattern, but also on the basis of functionality.

Summarizing the advantages which may be obtained by means of the belted or flexible ring-shaped structure described above, they are as follows:

(a) The elimination or voidance of free ends of threads or cords along the marginal peripheral edges of the belt structure thereby greatly reducing the possibility or opportunity for detachment of the threads or cords from the rubber compound or plastic material in which they are imbedded or with which they are coated.

(b) The possibility of building up any number of fabric planes (layers or plies) desired to obtain the necessary tensile strength for the structure with each fabric plane characterized by balanced zones wherein the threads forming a surface area of the structure defined within a definite perimeter are symmetrically crossed with threads lying in a second fabric plane forming an equal surface area defined within a second perimeter.

(c) The possibility of obtaining a flexible ring-shaped structure, the tensile strength of which is always proportional to the inflation pressure and to the tire diameter with the structure being produced from a single tuft or a single thread or cord and thus being devoid of free ends and joints. The structure is particularly strong and at the same time flexible so that running comfort of the vehicle upon which the tire is mounted is greatly improved. Each thread of the belt structure provides for a direct connection between the tread and the carcass of the pneumatic tire and by this means the number of layers disposed between the tread and the carcass may be reduced without sacrificing tensile strength.

(d) The elimination of the free ends of the threads or cords along the peripheral marginal edges of the structure as well as the elimination of joints between threads lying in different planes (layers or plies) prevents the formation of thicker or thinner zones in the finished tire which ordinarily give rise in conventional tires to local weakening and to static and dynamic unbalancing of the tire.

Although the present invention has been discussed with reference to particular embodiments and procedures for producing an improved flexible ring-shaped structure and pneumatic tire, various modifications and changes obvious to one skilled in the art are deemed to be within the spirit, scope and contemplation of the present invention.

What is claimed is:

1. A tire casing comprising a carcass, a ground-contacting tread portion on the outer periphery of said carcass, and a breaker strip within said carcass substantially co-extensive with said tread portion and substantially parallel to the ground-contacting surface of said tread portion, said breaker strip being ring-shaped and constituted of threads coated with a material selected from the group consisting of natural rubber, synthetic rubber and plastic materials, characterized in that said threads are arranged in a double layer, being oriented in two directions, crossing each other at angles which are symmetrical with respect to the mid-circumferential plane through said breaker strip, and in that the threads are folded at the side edges of said breaker strip, so as to lie alternately in the upper part and in the lower part of said double layer, said threads passing from the upper part to the lower part of said double layer at points which are located between the side edges of said breaker strip, said double layer being formed by continuous threads without free thread ends at the side edges of said breaker strip.

2. A tire casing according to claim 1 wherein said breaker strip is constituted of a fabric strip of at least one thread wound in a plurality of turns around a cylindrical form in a zig-zag pattern in such a way that said fabric strip runs along the pitches of a screw having a constant inclination and its direction changes when it reaches the edges of the breaker strip, said inclination being so chosen that the windings of the fabric strip lie one beside the other and form at least a double layer which covers the development of the cylindrical form with at least two thicknesses of said fabric strip substantially throughout said breaker strip.

3. A tire casing according to claim 1, wherein said breaker strip is composed of a fabric belt having a plurality of longitudinally extending parallel threads, said belt extending continuously at an angle to the mid-circumferential plane through said breaker strip and being folded alternately at the opposite side edges of said breaker strip so as to form a continuous double layer, wherein each portion of said fabric belt included between each two consecutive folds assumes the shape of a parallelogram having two opposite parallel sides falling along the opposite side edges respectively of said breaker strip and having two other opposite parallel sides extending at an angle to said mid-circumferential plane and in parallel relation to the threads of said portion, whereby the threads in any one parallelogram portion are oriented in a direction crossing the threads of an adjacent parallelogram portion.

4. A pneumatic tyre reinforcement comprising a band formed from convolutions of a filamentary material progressively wound obliquely in continuous lengths from one side of the band to the other and back in zig-zag formation, successive convolutions being slightly displaced so that a continuous band is formed, each length of the zig-zag formation which extends from one side of the band to the other in the case of all of the convolutions excepting the first and last convolution extending partially over and partially under lengths inclined in the opposite direction.

References Cited in the file of this patent

UNITED STATES PATENTS

| | | |
|---|---|---|
| 587,996 | McGiehan | Aug. 10, 1897 |
| 1,201,257 | Cobb | Oct. 17, 1916 |
| 1,294,330 | Carlisle | Feb. 11, 1919 |
| 1,366,220 | Swinehart | Jan. 18, 1921 |
| 2,381,184 | Ripley | Aug. 7, 1945 |
| 2,692,005 | De Cloud | Oct. 19, 1954 |

FOREIGN PATENTS

| | | |
|---|---|---|
| 21,428 | Great Britain | of 1906 |
| 359,917 | Great Britain | Apr. 25, 1930 |
| 508,165 | Belgium | Jan. 15, 1952 |

(Corresponding Great Britain Patent 700,435, Dec. 2, 1953)

| | | |
|---|---|---|
| 1,091,738 | France | Nov. 3, 1954 |

(Corresponding Great Britain Patent 731,286, June 8, 1955)